United States Patent
Vijayasankar et al.

(10) Patent No.: US 12,328,747 B2
(45) Date of Patent: *Jun. 10, 2025

(54) ENHANCED BROADCAST TRANSMISSION IN UNSLOTTED CHANNEL HOPPING MEDIUM ACCESS CONTROL

(71) Applicant: TEXAS INSTRUMENTS INCORPORATED, Dallas, TX (US)

(72) Inventors: Kumaran Vijayasankar, Allen, TX (US); Ramanuja Vedantham, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/438,588

(22) Filed: Feb. 12, 2024

(65) Prior Publication Data

US 2024/0188105 A1    Jun. 6, 2024

Related U.S. Application Data

(60) Continuation of application No. 18/157,944, filed on Jan. 23, 2023, now Pat. No. 11,937,271, which is a continuation of application No. 17/508,787, filed on Oct. 22, 2021, now Pat. No. 11,589,333, which is a division of application No. 16/877,861, filed on May 19, 2020, now Pat. No. 11,184,879, which is a continuation of application No. 15/009,279, filed on Jan. 28, 2016, now Pat. No. 10,687,309.

(60) Provisional application No. 62/158,702, filed on May 8, 2015.

(51) Int. Cl.
*H04W 72/30* (2023.01)
*H04W 84/18* (2009.01)

(52) U.S. Cl.
CPC ............ *H04W 72/30* (2023.01); *H04W 84/18* (2013.01)

(58) Field of Classification Search
CPC ........................... H04W 72/005; H04W 84/18
See application file for complete search history.

(56) References Cited

U.S. PATENT DOCUMENTS

| | | |
|---|---|---|
| 11,026,170 B2 | 6/2021 | Xhafa et al. |
| 2005/0271006 A1 | 12/2005 | Chari |
| 2009/0006596 A1 | 1/2009 | Dinakaran et al. |
| 2009/0238153 A1 | 9/2009 | Sim |

(Continued)

FOREIGN PATENT DOCUMENTS

| | | |
|---|---|---|
| CN | 101326774 A | 12/2008 |
| CN | 101485213 A | 7/2009 |

(Continued)

OTHER PUBLICATIONS

IEEE Std. 802.15.4-2011, Local and metropolitan area networks, "Part 15.4: Low-Rate Wireless Personal Area Networks (LR-WPANs)", Sep. 5, 2011, 314 pgs.

(Continued)

*Primary Examiner* — Brian P Cox
(74) *Attorney, Agent, or Firm* — Michelle F. Murray; Frank D. Cimino

(57) ABSTRACT

A method of operating a mesh network is disclosed. The method includes joining a network as a child of a parent node and receiving a downlink broadcast channel from the parent node. The method further includes setting the downlink broadcast channel as an uplink broadcast channel in response to the step of receiving.

21 Claims, 4 Drawing Sheets

(56) References Cited

U.S. PATENT DOCUMENTS

| | | |
|---|---|---|
| 2010/0144283 A1 | 6/2010 | Curcio et al. |
| 2012/0077508 A1 | 3/2012 | Khan et al. |
| 2013/0022084 A1 | 1/2013 | Vasseur et al. |
| 2013/0094536 A1 | 4/2013 | Hui et al. |
| 2013/0279540 A1 | 10/2013 | Hui et al. |
| 2014/0016540 A1 | 1/2014 | Barrett |
| 2014/0126610 A1 | 5/2014 | Hui et al. |
| 2016/0134468 A1 | 5/2016 | Hui et al. |
| 2016/0134539 A1 | 5/2016 | Hui et al. |
| 2016/0249400 A1 | 8/2016 | Somasandharam et al. |
| 2016/0270030 A1 | 9/2016 | Yu et al. |

FOREIGN PATENT DOCUMENTS

| | | |
|---|---|---|
| CN | 101669400 A | 3/2010 |
| CN | 102771172 A | 11/2012 |
| CN | 103313206 A | 9/2013 |
| EP | 2755429 A1 | 7/2014 |

OTHER PUBLICATIONS

Wi-Sun Alliance, Field Area Networking Group (FANWG), "Technical Profile Specification Field Area Network", Version 0v79, 2013, 128 pgs.

IEEE Draft Std. P802.15.4e/D6.0, Local and metropolitan area networks, "Part 15.4: Low-Rate Wireless Personal Area Networks (WPANS)", Amendment 5: Amendment to the MAC sub-layer, Jul. 2011, 200 pgs.

| OCTETS: 4 | 2 | 1 | 1 | 1 | | 1 | | VARIABLE |
|---|---|---|---|---|---|---|---|---|
| BROADCAST INTERVAL | BROADCAST SCHEDULE IDENTIFIER | DWELL INTERVAL | CLOCK DRIFT | TIMING ACCURACY | BITS: 3 | 3 | 2 | |
| | | | | | CHANNEL PLAN | CHANNEL FUNCTION | EXCLUDED CHANNEL CONTROL | CHANNEL INFORMATION FIELDS |

| 2 BITS | 14 BITS |
|---|---|
| BS TYPE | BSI |

FIG. 6A

| BS TYPE FIELD | BS TYPE |
|---|---|
| 00 | UP AND DOWN |
| 01 | UP |
| 10 | DOWN |
| 11 | RESERVED |

FIG. 6B

ENHANCED BROADCAST TRANSMISSION IN UNSLOTTED CHANNEL HOPPING MEDIUM ACCESS CONTROL

CROSS-REFERENCE TO RELATED APPLICATIONS

This application is a continuation of U.S. patent application Ser. No. 18/157,944, filed Jan. 23, 2023, which is a continuation of U.S. patent application Ser. No. 17/508,787, filed Oct. 22, 2021, now U.S. Pat. No. 11,589,333, which is a divisional of U.S. patent application Ser. No. 16/877,861, filed May 19, 2020, now U.S. Pat. No. 11,184,879, which is a continuation of U.S. patent application Ser. No. 15/009,279, filed Jan. 28, 2016, now U.S. Pat. No. 10,687,309, which claims the priority benefit of U.S. Provisional Patent Application No. 62/158,702, filed May 8, 2015, which applications are hereby incorporated herein by reference.

BACKGROUND OF THE INVENTION

The present embodiments relate to wireless mesh communication system and, more particularly, to enhanced broadcast transmission in Field and Personal Area Networks.

A wireless mesh network is a type of wireless communication system where at least one wireless transceiver must not only receive and process its own data, but it must also serve as a relay for other wireless transceivers in the network. This may be accomplished by a wireless routing protocol where a data frame is propagated within the network by hopping from transceiver to transceiver to transmit the data frame from a source node to a destination node. A wireless node may be a wireless access point such as a wireless router, a mobile phone, or a computer capable of accessing a wireless Field Area Network (FAN). In other applications, the wireless node may be an external security monitor, a room monitor, a fire or smoke detector, a weather station, or any number of other FAN applications for home or business environments.

A practical mesh network must maintain continuous network paths for all wireless nodes. This requires reliable network formation, reconfiguration around broken or interrupted network paths, and prioritized routing to ensure that data frames travel from source to destination along short yet reliable network paths.

FIG. 1 shows an exemplary wireless Field Area Network (FAN) of the prior art as disclosed in version Ov79 of the 2013 Wi-SUN Alliance Field Area Network Working Group, which is incorporated by reference herein in its entirety. The FAN includes an upper level Wi-Fi control circuit 160 which is directly connected to the internet and serves network nodes within the FAN via Wireless Area Network (WAN) Backhaul circuit 150. The FAN also includes Personal Area Network (PAN) circuits A through C. Each of PAN communicates with WAN Backhaul circuit 150 through respective Border Router Nodes (BR) 100, 120, and 130.

PAN A is an exemplary network that may be similar to PANs B and C. PAN A communicates with WAN Backhaul circuit 150 through Border Router Node (BR) 100. BR 100 communicates directly with Relay node (RN) 102 and with Leaf Node (LN) 114. Thus, BR 100 is a parent node of RN 102 and LN 114. RN 102 is a parent of RN 104 and communicates indirectly with LN 106 via RN 104. RN 102 also communicates directly with RN 108 and indirectly with RN 110 via RN 108. RN 108 also communicates directly with LN 112. RN 108 is a parent of both RN 110 and LN 112.

Once a network node enters a PAN, it may communicate with other nodes of the PAN by uplink transmission to a parent, by downlink transmission to a child, or by peer-to-peer transmission. The mechanisms for each type of transfer depend on whether the network supports transmission of periodic beacons. If the network produces periodic beacons, these may be used by network nodes for synchronization. Alternatively, a network node may not require synchronization and may transmit asynchronously. For either synchronous or asynchronous transmission, however, the beacon is still required for network discovery so that a node may initially join the PAN. Network communication within the PAN is accomplished by Medium Access Control (MAC) frames. These include beacon frames, data frames, acknowledgement frames, and MAC command frames.

PAN nodes use carrier sense multiple access with collision avoidance (CSMA-CA) for either synchronous or asynchronous transmission. Synchronous transmissions are aligned to a PAN beacon with a corresponding back off period. Asynchronous transmissions within the PAN are transmitted on an unslotted CSMA-CA channel. For asynchronous transmission, a node waits for a random back off period while listening to the channel. If the channel is busy, the node waits for another random back off period before trying to access the channel again. When the channel is idle, the node transmits the desired frame. A corresponding return acknowledgement frame without CSMA-CA confirms reception.

Channel hopping has been widely adopted for communicating between network nodes in many wireless and wireline communication systems. Channel hopping essentially involves transmitting signals on different carrier frequencies among many available sub-carriers at different instances of time. A pseudorandom sequence known to both the transmitter and receiver is usually used so that the intended receiver can listen on the correct channel. This improves communication robustness to external noise and helps counter jamming and eavesdropping. Multiple technologies such as Bluetooth and Digital Enhanced Cordless Telecommunications (DECT) incorporate channel hopping mechanisms. Channel hopping may be achieved through many different methods. Among the most common methods are synchronous channel hopping or Time Slotted Channel Hopping (TSCH) and asynchronous unslotted channel hopping as defined in IEEE 802.15.4e, which is incorporated herein by reference in its entirety. Many standards also exist that use such channel hopping MAC to define MAC protocols for different applications such as the Wi-SUN Alliance FAN.

Referring to FIG. 2, there is a diagram of unslotted channel hopping for network nodes A, B, and C. In unslotted channel hopping MAC, each node picks a hopping sequence and hops their receivers to different channels according sequence. Each node spends a specified time or dwell interval on each channel before hopping to the next channel. Many methods exist to track the unslotted channel hopping sequence of neighboring nodes within the PAN such as the FH-Discover method proposed by the Wi-SUN Alliance.

There are several problems, however, that may occur with various channel hopping communication systems. Unicast transmissions to a specific receiver are receiver directed in the sense that a node transmits a frame in the receiver's channel using CSMA-CA. Referring to FIG. 3, for example, Node A has a normal hopping sequence 1-2-3-4-5. Node B has a normal hopping sequence 1-5-2-4-3. Node A receives a data request from Node B on channel 2. Node A responsively transmits Data to Node B on channel 5. Node B receives the Data and transmits an acknowledgement (ACK) to Node A on channel 5. But the Data and ACK exceed the dwell period of channel 5 and cause Node B to temporarily abandon its normal hopping sequence on channel 2. If another node of the PAN transmits a data frame to Node B on channel 2 according to its normal hopping sequence, the frame will be lost, since Node B is still communicating with Node A on channel 5.

Another problem may arise during broadcast transmission within the PAN. Broadcast transmission occurs during broadcast listening slots as shown in FIG. 4. Each node advertises its broadcast listening slot which is transmitter directed and all other nodes who are interested in the broadcast transmissions can then listen to the advertised node's broadcast channel. When a device listens to another nodes broadcast slot, it has to tune its receiver to the advertised broadcast channel. This requires the node to deviate from its advertised unicast channel. The node then resumes its unicast channel hopping after completing the broadcast channel listening as though no deviation had occurred. For example, when node A listens to a broadcast by node B, other nodes in the PAN will not know that node A has suspended its unicast schedule. If another PAN node transmits frame to node A based on its advertised unicast schedule the frame will be lost.

Another problem occurs when there is no limit to a number of broadcast channels to which a node may listen. In this case, a node may spend much of its time listening on a broadcast channel. Therefore, it does not follow its unicast channel hopping schedule and may miss unicast transmissions from other nodes within the PAN. A similar problem occurs when a node listens to only a few other node broadcasts to maximize time on its unicast schedule. In this case it may lose required broadcast data from other nodes. For example, nodes may lose routing information such as Routing Protocol for Low-Power and Lossy Network (RPL) frames. Thus, the node may not be able to choose a better parent when available. One solution is to have a single global broadcast schedule for all nodes to follow. But this limits broadcast transmissions to a single schedule and requires precise time synchronization of all nodes.

Although network proposals of the prior art provide steady improvements in wireless network communications, the present inventors have recognized that still further improvements in mesh network protocol are possible. Accordingly, preferred embodiments described below are directed toward this and other improvements over the prior art.

BRIEF SUMMARY OF THE INVENTION

In a first embodiment of the present invention, there is disclosed a method of operating a mesh network in a wireless communication system. The method includes joining a network as a child of a parent node and receiving a downlink broadcast channel from the parent node. The method further includes setting the downlink broadcast channel as an uplink broadcast channel in response to the step of receiving.

In a second embodiment of the present invention, there is disclosed a method of operating a mesh network in a wireless communication system. The method includes transmitting a beacon from a first node to a second node. The first node directs the second node to set an uplink broadcast channel that is the same as a downlink broadcast channel of the first node.

BRIEF DESCRIPTION OF THE SEVERAL VIEWS OF THE DRAWING

FIG. 6A is a Broadcast Schedule Information Element (BS-IE) frame of the present invention;

FIG. 6B is a diagram showing Broadcast Schedule type bits of FIG. 6A;

DETAILED DESCRIPTION OF THE INVENTION

Figure 1:
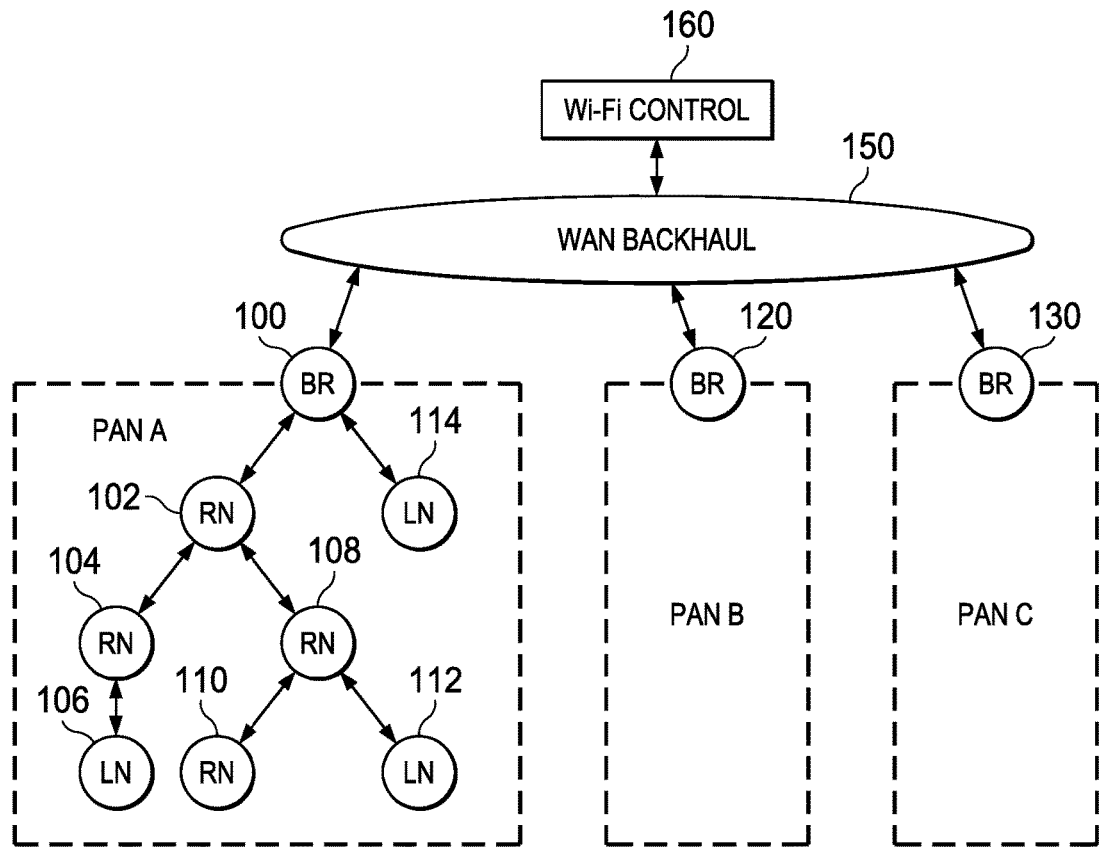
FIG. 1 is a diagram showing an exemplary wireless Field Area Network (FAN) of the prior art.
Figure 2:
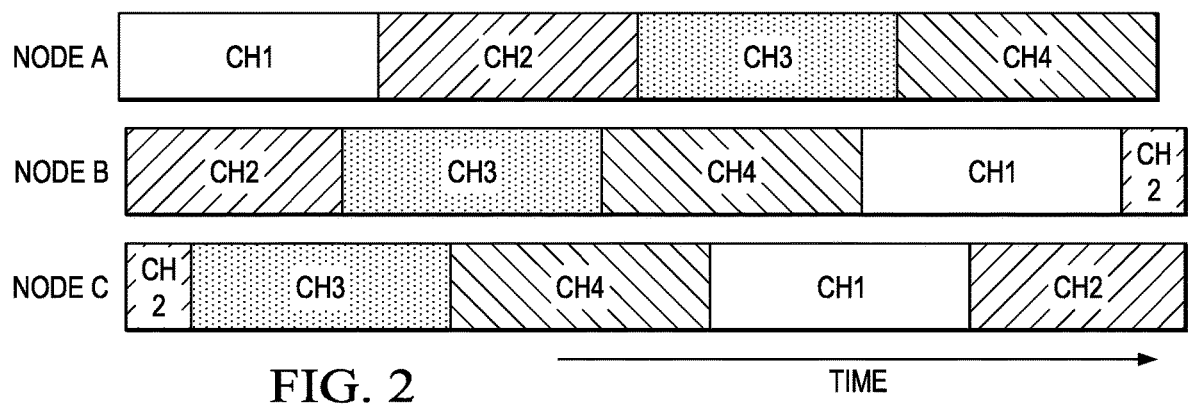
FIG. 2 is a diagram showing exemplary channel hopping schedules for respective network nodes A, B, and C.
Figure 3:
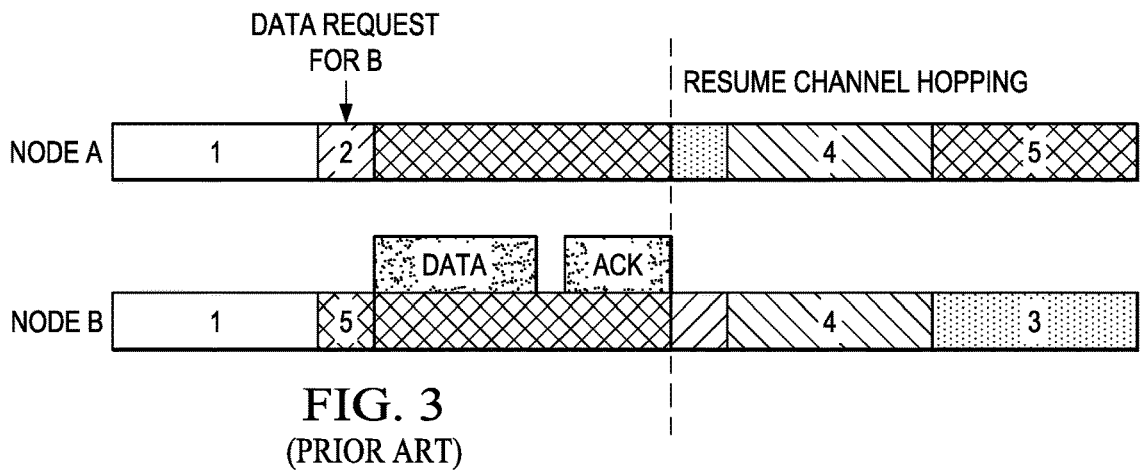
FIG. 3 is a diagram showing a problem that may arise with unslotted channel hopping for network nodes A, B, and C according to the prior art.
Figure 4:
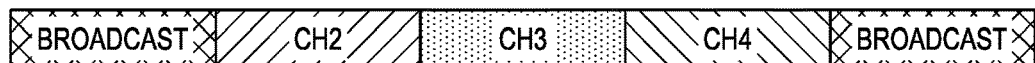
FIG. 4 is an exemplary diagram showing a relation between unicast and broadcast schedules of the prior art.
Figure 5:
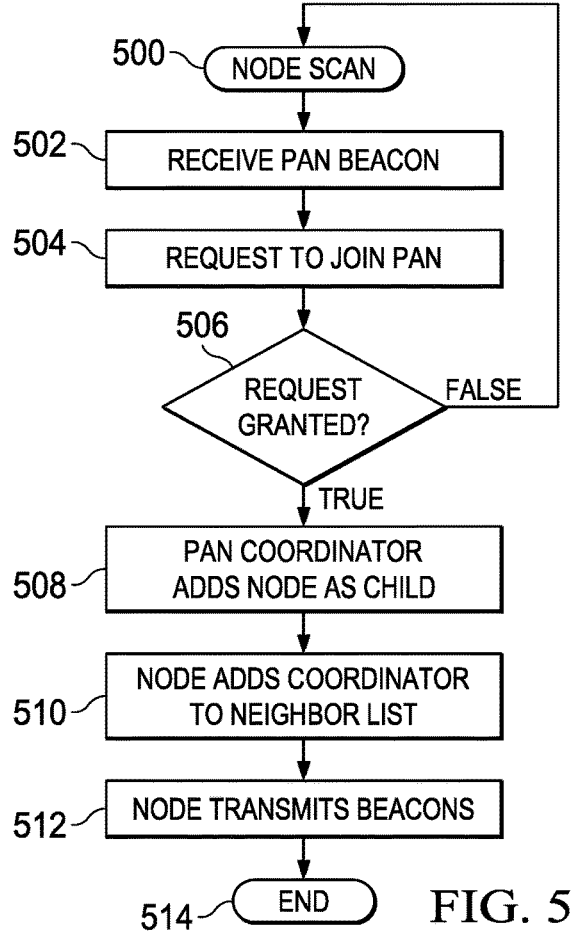
FIG. 5 is a flow diagram showing network discovery and PAN entry by a candidate node according to the present invention.

Referring now to FIG. 5, there is a flow diagram showing network discovery and PAN entry by a candidate node according to the present invention. The method begins at step 500 when a candidate node attempting to join the PAN begins a passive scan. The candidate node receives a PAN beacon from the PAN coordinator at step 502 and requests to join the PAN at step 504. The PAN coordinator may grant or refuse the request at step 506. If the PAN coordinator refuses the request, the candidate node resumes the passive scan at step 500. Alternatively, if the request is granted the PAN coordinator adds the candidate node as a child at step 508. At step 510, the newly added node adds the PAN coordinator to its neighbor list. The node then transmits its own beacons to the PAN. PAN entry is complete at step 514.

Referring now to FIG. 6A, there is a Broadcast Schedule Information Element (BS-IE) frame of the present invention. This frame is an information element or beacon that identifies the broadcast schedule of the originating or advertising node. Broadcast transmissions are required for multicasting data and for routing. For example, RPL routing relies on broadcast messaging to form routes. Unlike conventional systems, broadcast transmissions in unslotted channel hopping networks occur only during dedicated broadcast periods on specific frequencies. Thus, transmit and receive broadcasts must be synchronized to be successful. Network nodes typically use uplink broadcasts for transmissions to network neighbors or for route discovery procedure.

The Broadcast Interval (BI) field of the BS-IE is a 32-bit (4 octets) unsigned integer indicating the duration in milliseconds between Broadcast Dwell intervals within the advertising node's broadcast schedule. The Broadcast Schedule Identifier (BSI) field is a 16-bit (2 octets) unsigned integer set to the BSI value corresponding broadcast channel hopping sequence currently in use in the PAN. The Dwell Interval (DI) field is an 8-bit unsigned integer set to the time in milliseconds during which the node is active on each channel of its hopping schedule. The Clock Drift field is an 8-bit unsigned integer set to the reporting node's worst case drift of the clock it uses to measure its frequency hopping DI. The Timing Accuracy field is an 8-bit unsigned integer that indicates the accuracy of time values generated by the node to a resolution of 10 microseconds. The Channel Plan field is a 3-bit unsigned integer indicating the source of the node's channel plan. The Channel Function field is a 3-bit unsigned integer indicating the source of the node's channel function. The Excluded Channel Control field is a 2-bit integer indicating whether there are excluded channels in the BS-IE. The Channel Information Fields have a variable size and indicate specific details including channel spacing, the number of channels, the channel hop count, the channel hop list, and excluded channel ranges.

Turning now to FIG. 6B, there is a diagram showing Broadcast Schedule type bits of FIG. 6A according to the present invention. As previously discussed, the Broadcast Schedule Identifier field is a 16-bit (2 octets) unsigned integer set to the BSI value corresponding broadcast channel hopping sequence currently in use in the PAN. The first 2 bits indicate the Broadcast Schedule (BS) Type. The remaining 14 bits indicate the broadcast channel hopping sequence currently in use in the PAN. The BS Type field is set to 00 to indicate the broadcast channel is for uplink and downlink communication. It is set to 01 to indicate the broadcast channel is for uplink communication only and set to 10 to indicate the broadcast channel is for downlink communication only.

Figures 7, 8A, 8B:
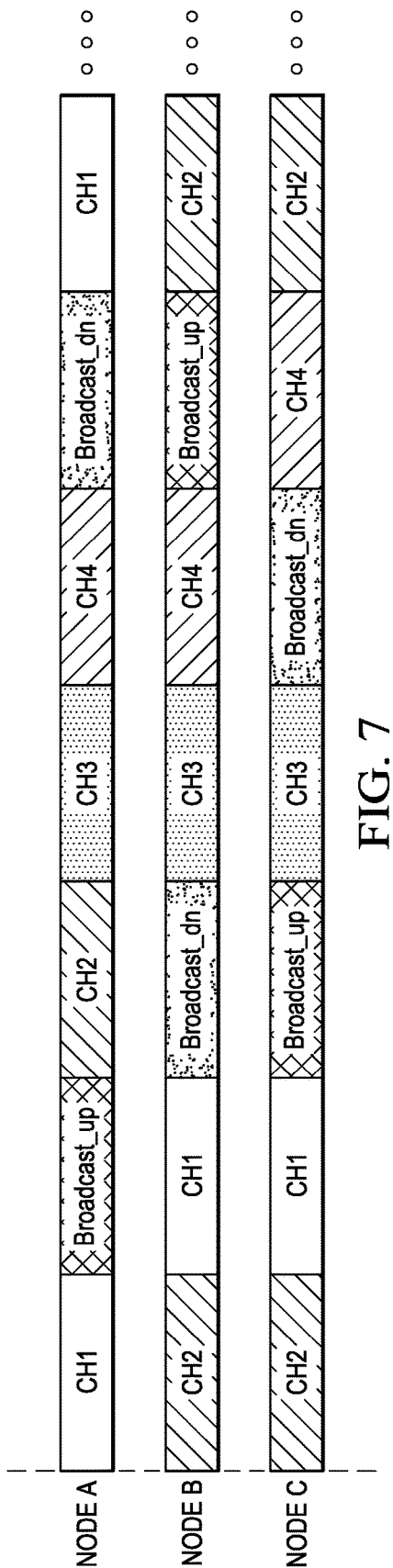
FIG. 7 is a diagram showing a relation between unicast and broadcast schedules for nodes A, B, and C according to the present invention.
FIG. 8A is a Personal Area Network Information Element (PAN-IE) frame of the present invention.
FIG. 8B is a diagram showing Broadcast Schedule Mode bits of FIG. 8A.

When a network node receives the BS-IE frame from a parent (502, FIG. 5) it sets its uplink broadcast channel to the parent downlink broadcast channel (510, FIG. 5). This is illustrated in the diagram of FIG. 7, where Node A is a parent of Node B, and Node B is a parent of Node C. If Node A communicates directly with the BR node of the PAN, it sets its uplink broadcast channel (Broadcast_up) to the same time and frequency as the downlink broadcast of the BR node. Node A also selects a downlink broadcast channel (Broadcast_dn) between CH4 and CHI. Node B sets its uplink broadcast channel (Broadcast_up) to the same time and frequency as the downlink broadcast of Node A. Node B also selects a downlink broadcast channel (Broadcast_dn) between CHI and CH3. Node C sets its uplink broadcast channel (Broadcast_up) to the same time and frequency as the downlink broadcast of Node B. Node C also selects a downlink broadcast channel (Broadcast_dn) between CH3 and CH4. This procedure is highly advantageous for several reasons. First, it assures a child node will not miss downlink broadcasts from its parent node. The child will transmit uplink broadcasts during the parent downlink broadcast period using CSMA-CA. If there is a parent downlink broadcast, therefore, the child will receive it. Second, the child node may select any downlink broadcast schedule or reuse an existing uplink broadcast schedule. Third, the selected broadcast schedules are communicated to other network nodes along with channel hopping patterns after the network node enters the PAN and transmits its own beacons (512, FIG. 5). Fourth, each network node may choose to have a downlink broadcast schedule that is the same as its uplink broadcast schedule. In this case, all network nodes share a common broadcast schedule and network maintenance and implementation is greatly simplified. Finally, each node may independently select different broadcast schedules to maximize broadcast channel diversity.

In an alternative embodiment of the present invention, a Border Router (BR) node may specify the broadcast operating mode for network nodes of the PAN. The diagram of FIG. 8A is a Personal Area Network Information Element (PAN-IE), which is part of a MAC command frame according to the present invention. The PAN Size field is a 16-bit (2 octets) unsigned integer set to the number of PAN nodes communicating through the BR. The Routing cost field is an 8-bit unsigned integer set to an estimate of the logical distance or number of nodes of the routing path from the node to the BR. The Use Parent BS-IE field is a 1-bit signal indicating whether the receiving node must propagate the parent's BS-IE. If the bit is set to 1, a receiving node must use the parent's broadcast schedule as indicated by the parent's BS-IE. If the bit is set to 0, the receiving node may create its own broadcast schedule in a respective BS-IE. The Routing Method field is a 1-bit signal indicating whether the PAN is a level 2 or level 3 network. The EAPOL Ready field is a 1-bit signal indicating whether the transmitting node may accept EAPOL authenticated messages. One bit of the 6-bit reserved field is used to indicate the directed broadcast (BS) mode of the receiving node. As shown in FIG. 8B, this 1-bit field is set to 0 to indicate the broadcast channel is globally unique. In this case, each node of the PAN uses the same uplink and downlink broadcast periods. Alternatively, if the BS Mode field is set to 1, the receiving node selects the parent node downlink broadcast period for its uplink broadcast period and selects a downlink broadcast period at its own discretion. When a node picks different broadcast schedules for uplink and downlink directions, it should also periodically exchange the timing information for each schedule so that other nodes can follow the different schedules separately.

A node may select more than one uplink schedule. If so, it should inform other PAN nodes of the selected schedules in its message exchanges. However, it is preferable to limit the number of different uplink BS-IEs to which a node may listen, to a maximum of two to keep the network management tractable. In particular, if a network node selects more than one downlink broadcast schedule, children should be informed so that they can follow all parent downlink broadcasts. A node may also change the different BS-IEs that it monitors and then advertise that in its configuration beacon. For example a node may get a beacon from a new node and decide to follow the new node while still following its parent. In such cases, the node should follow its preferred parent's downlink schedule while also following the alternate node's broadcast schedule. After a while the device may choose to change the parent or stop monitoring the alternate node's schedule.

When a node receives a broadcast frame in its uplink BS slot, it indicates that to the next higher layer (NHL). The NHL may then choose to send the frame in its downlink BS slot to ensure that a different set of nodes actually receive the broadcast frame. The NHL, therefore, should thus specify whether the broadcast frame is to be transmitted in an uplink or downlink broadcast period.

A packet received during uplink broadcast period is from the receiving node's parent. Therefore, it should be rebroadcast in the receiving nodes downlink period to assure the node's children receive the broadcast frame. Likewise, a reciprocal operation should be performed when a broadcast frame is received during a node's downlink broadcast period. Since this frame is from a child, it should be rebroadcast to other of the node's children in the PAN.

Still further, while numerous examples have thus been provided, one skilled in the art should recognize that various modifications, substitutions, or alterations may be made to the described embodiments while still falling with the inventive scope as defined by the following claims. For example, although preferred embodiments of the present invention are applied to a Directed Acyclic Graph or tree-like network, they may be readily adapted to any network topology. Other combinations will be readily apparent to one of ordinary skill in the art having access to the instant specification.

What is claimed is:

1. A method comprising:
    joining a network, by a wireless device, as a child of a parent device;
    setting an uplink broadcast channel of the wireless device to a same time and frequency of a downlink broadcast channel of the parent device;
    setting a downlink broadcast channel of the wireless device to a time or frequency that is different from the time or frequency of the downlink broadcast channel of the parent device; and
    transmitting, by the wireless device, a beacon that includes a first broadcast schedule information element that specifies the downlink broadcast channel of the wireless device.

2. The method of claim 1, wherein the first broadcast schedule information element comprises a broadcast schedule identifier field specifying the downlink broadcast channel of the wireless device.

3. The method of claim 2, wherein the broadcast schedule identifier field comprises a broadcast type field and a broadcast schedule identifier value.

4. The method of claim 3, wherein the broadcast schedule identifier field is a 16 bit field.

5. The method of claim 2, wherein the first broadcast schedule information element further comprises:
    a broadcast interval field indicative of a duration between broadcast dwell intervals;
    a dwell interval field indicative of a time in which the wireless device is active on each channel of a hopping schedule; and
    a clock drift field indicative of a clock drift of the wireless device.

6. The method of claim 5, wherein the broadcast interval field is a 32 bit field, wherein the dwell interval field is an 8 bit field, and wherein the clock drift field is an 8 bit field.

7. The method of claim 5, wherein the first broadcast schedule information element further comprises:
    a timing accuracy field;
    a channel plan field;
    a channel function field;
    an excluded channel control field; and
    a channel information field.

8. The method of claim 7, wherein the timing accuracy field is an 8 bit field, wherein the channel plan field is a 3 bit field, wherein the channel function field is a 3 bit field, and wherein the excluded channel control field is a 2 bit field.

9. The method of claim 1, further comprising receiving a second broadcast schedule information element that specifies the downlink broadcast channel of the parent device, wherein setting the uplink broadcast channel of the wireless device comprises setting the uplink broadcast channel of the wireless device based on the second broadcast schedule information element.

10. The method of claim 1, further comprising:
    attempting to transmit, by the wireless device, an uplink broadcast during a downlink broadcast period of the parent device; and
    receiving, by the wireless device, a downlink broadcast from the parent device during the downlink broadcast period.

11. The method of claim 10, wherein attempting to transmit the uplink broadcast during the downlink broadcast period of the parent device comprises attempting to transmit the uplink broadcast using carrier sense multiple access with collision avoidance (CSMA-CA).

12. A wireless device comprising:
    a transceiver; and
    a processor configured to:
        join a network as a child of a parent device;
        set an uplink broadcast channel to a same time and frequency of a downlink broadcast channel of the parent device;
        set a downlink broadcast channel to a time or frequency that is different from the time or frequency of the downlink broadcast channel of the parent device; and
        transmit, via the transceiver, a beacon that includes a first broadcast schedule information element that specifies the downlink broadcast channel of the wireless device.

13. The wireless device of claim 12, wherein the first broadcast schedule information element comprises a broadcast schedule identifier field specifying the downlink broadcast channel of the wireless device.

14. The wireless device of claim 13, wherein the broadcast schedule identifier field comprises a broadcast type field and a broadcast schedule identifier value.

15. The wireless device of claim 14, wherein the broadcast schedule identifier field is a 16 bit field.

16. The wireless device of claim 13, wherein the first broadcast schedule information element further comprises:
    a broadcast interval field indicative of a duration between broadcast dwell intervals;
    a dwell interval field indicative of a time in which the wireless device is active on each channel of a hopping schedule; and
    a clock drift field indicative of a clock drift of the wireless device.

17. The wireless device of claim 16, wherein the broadcast interval field is a 32 bit field, wherein the dwell interval field is an 8 bit field, and wherein the clock drift field is an 8 bit field.

18. The wireless device of claim 16, wherein the first broadcast schedule information element further comprises:
    an 8 bit timing accuracy field;
    a 3 bit channel plan field;
    a 3 bit channel function field;
    a 2 bit excluded channel control field; and
    a channel information field.

19. The wireless device of claim 12, further comprising receiving a second broadcast schedule information element that specifies the downlink broadcast channel of the parent device, wherein setting the uplink broadcast channel of the wireless device comprises setting the uplink broadcast channel of the wireless device based on the second broadcast schedule information element.

20. The wireless device of claim 12, further comprising:
    attempting to transmit, by the wireless device, an uplink broadcast during a downlink broadcast period of the parent device; and
    receiving, by the wireless device, a downlink broadcast from the parent device during the downlink broadcast period.

21. The wireless device of claim 20, wherein attempting to transmit the uplink broadcast during the downlink broadcast period of the parent device comprises attempting to transmit the uplink broadcast using carrier sense multiple access with collision avoidance (CSMA-CA).

\* \* \* \* \*